(12) United States Patent
Quijano et al.

(10) Patent No.: US 7,317,613 B2
(45) Date of Patent: Jan. 8, 2008

(54) ELECTRONIC DEVICE QUICK CONNECT SYSTEM

(75) Inventors: David Quijano, Magnolia, TX (US); Randall W. Martin, The Woodlands, TX (US); Nick Woodley, London (GB); Tom J. Searby, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 112 days.

(21) Appl. No.: 11/263,483

(22) Filed: Oct. 31, 2005

(65) Prior Publication Data

US 2007/0097619 A1    May 3, 2007

(51) Int. Cl.
*G06F 1/16* (2006.01)

(52) U.S. Cl. ............ 361/686; 361/681; 361/683; 248/274.1; 248/917; 16/323; 16/326; 16/335; 439/374; 439/534; 439/929

(58) Field of Classification Search .......... 361/681, 361/683, 686, 679, 680; 439/534, 374, 929; 248/917–924, 118.3, 274.1, 314, 122.1, 346.1, 248/346, 510, 124.1, 459, 489; 312/223.2, 312/223.3, 235 A; 345/501, 169, 905
See application file for complete search history.

(56) References Cited

U.S. PATENT DOCUMENTS

| | | | |
|---|---|---|---|
| 5,619,398 A | 4/1997 | Harrison et al. | |
| 5,687,060 A | 11/1997 | Ruch et al. | |
| 5,997,323 A | 12/1999 | Youn | |
| 6,034,869 A | 3/2000 | Lin | |
| 6,061,234 A | 5/2000 | Broder et al. | |
| 6,069,790 A | 5/2000 | Howell et al. | |
| 6,400,560 B1 * | 6/2002 | Chian | 361/681 |
| 6,504,710 B2 * | 1/2003 | Sutton et al. | 361/686 |
| 6,695,270 B1 * | 2/2004 | Smed | 248/274.1 |
| 6,702,604 B1 * | 3/2004 | Moscovitch | 439/374 |
| 6,758,454 B2 * | 7/2004 | Smed | 248/314 |
| 6,833,988 B2 | 12/2004 | Kamphuis et al. | |
| 6,856,506 B2 * | 2/2005 | Doherty et al. | 361/683 |
| 6,898,079 B2 | 5/2005 | Park | |
| 6,935,883 B2 * | 8/2005 | Oddsen, Jr. | 439/374 |
| 6,944,012 B2 | 9/2005 | Doczy et al. | |
| 6,952,343 B2 * | 10/2005 | Sato | 361/686 |
| 6,959,287 B2 * | 10/2005 | Rabideau et al. | 705/30 |
| 7,159,053 B1 * | 1/2007 | Lakin | 710/62 |

\* cited by examiner

*Primary Examiner*—Michael Datskovskiy

(57) ABSTRACT

A quick connect system for an electronic device, comprising a docking station configured to engage the electronic device, the docking station having a locking mechanism actuatable to an unlocked position, the locking mechanism configured to independently remain in the unlocked position and automatically return to a locking position in response to disengagement of the electronic device from the docking station.

28 Claims, 14 Drawing Sheets

ELECTRONIC DEVICE QUICK CONNECT SYSTEM

BACKGROUND OF THE INVENTION

Electronic devices, such as computer display devices, are oftentimes disposed behind or near the back of a desk, against a wall and/or mounted back to back. As a result, such computer displays are difficult to install, and access to the computer displays for maintenance, repair, etc., is inhibited. This is especially true in instances where arrays of computer displays are disposed in close proximity to each other to provide a multi-display and/or composited graphical presentation. Accordingly, quick release mechanisms have been devised to more easily mount the display devices. However, these mechanisms are difficult to actuate, and installing and/or making wired connections to the display devices remains cumbersome.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1-12b of the drawings, like numerals being used for like and corresponding parts of the various drawings.

Figure 1:
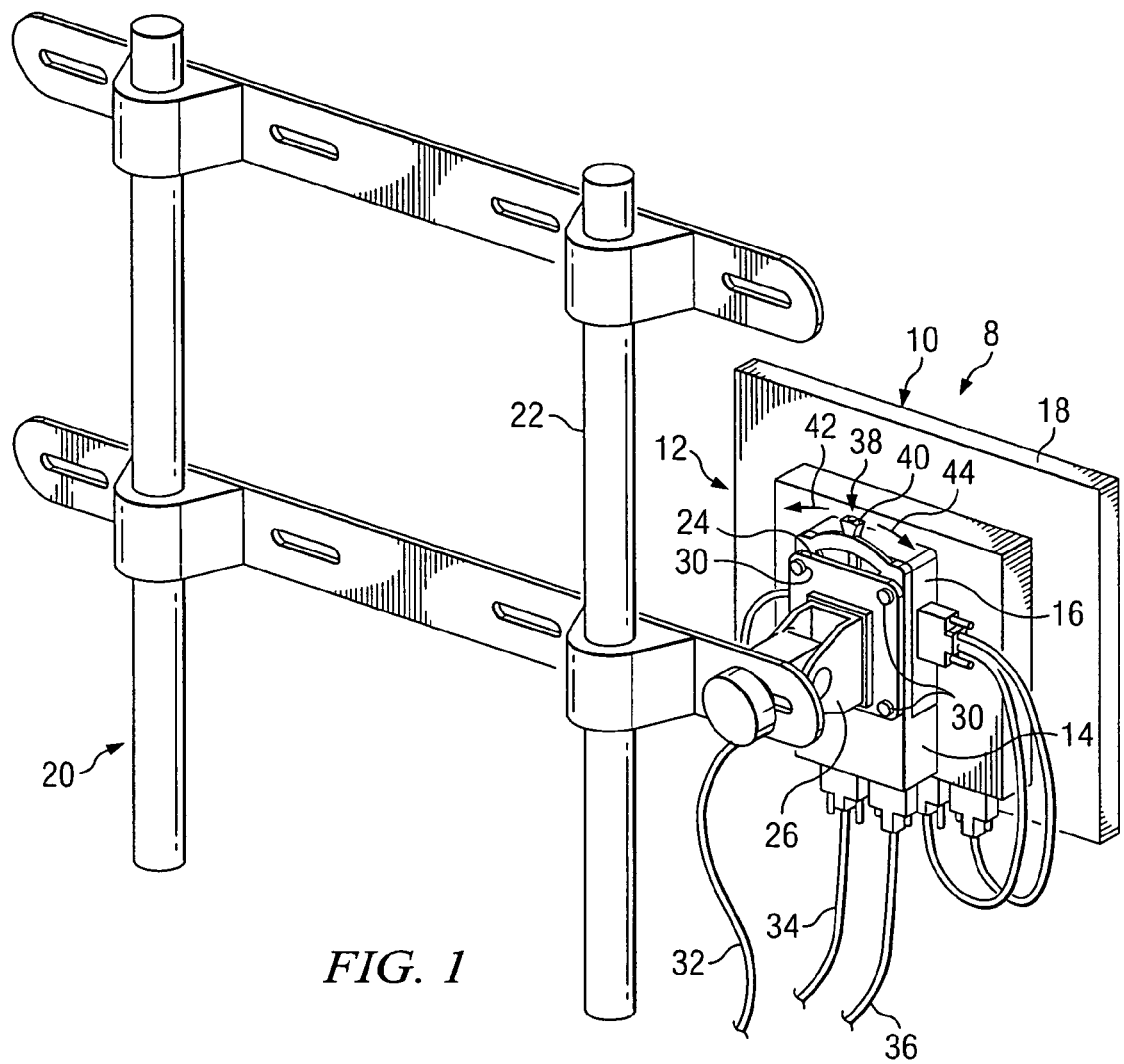
FIG. 1 is a diagram illustrating an embodiment of a quick connect system in accordance with the present invention.
Figure 2:
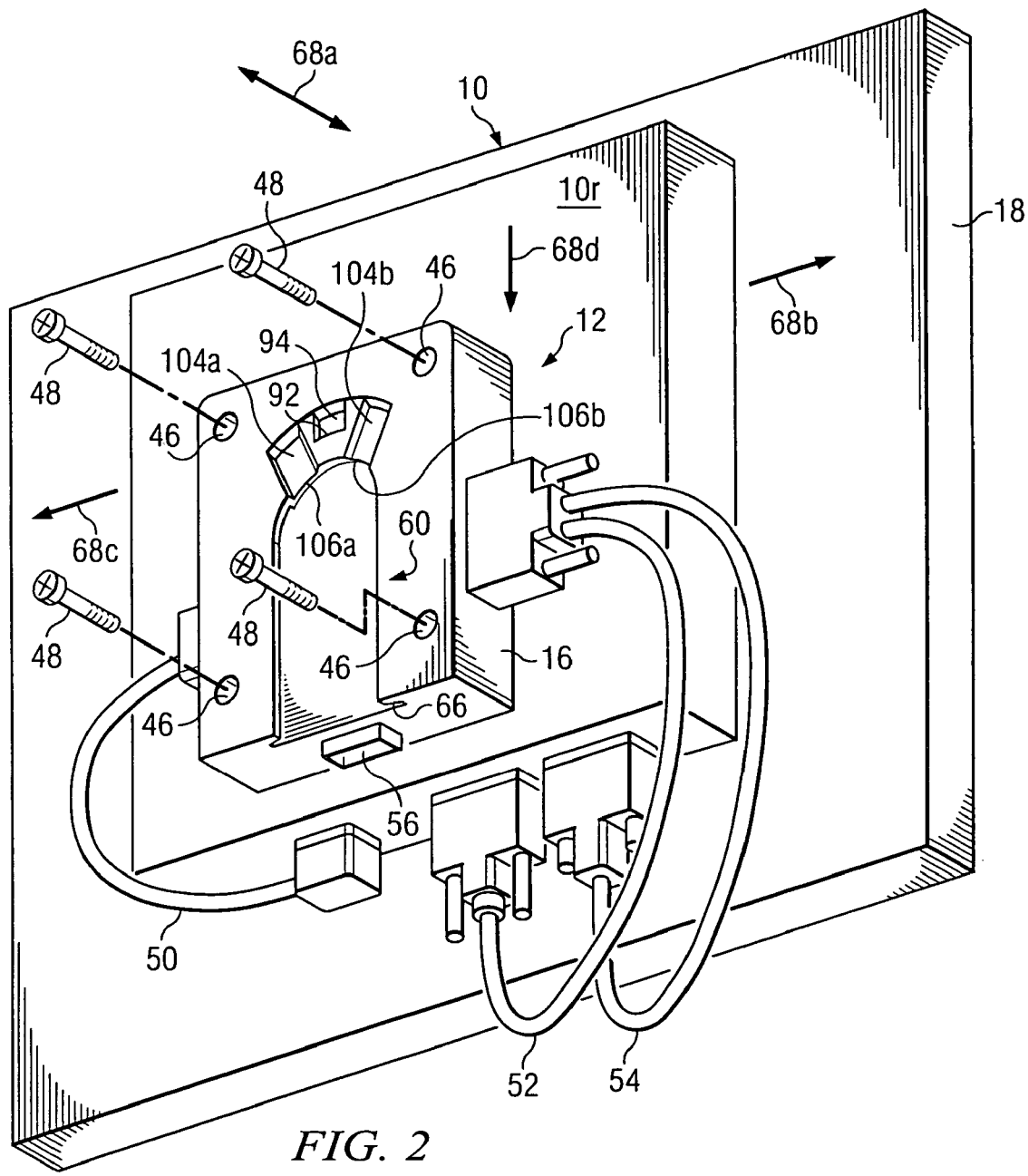
FIG. 2 is a diagram illustrating a portion of the quick connect system of FIG. 1.
Figure 3:
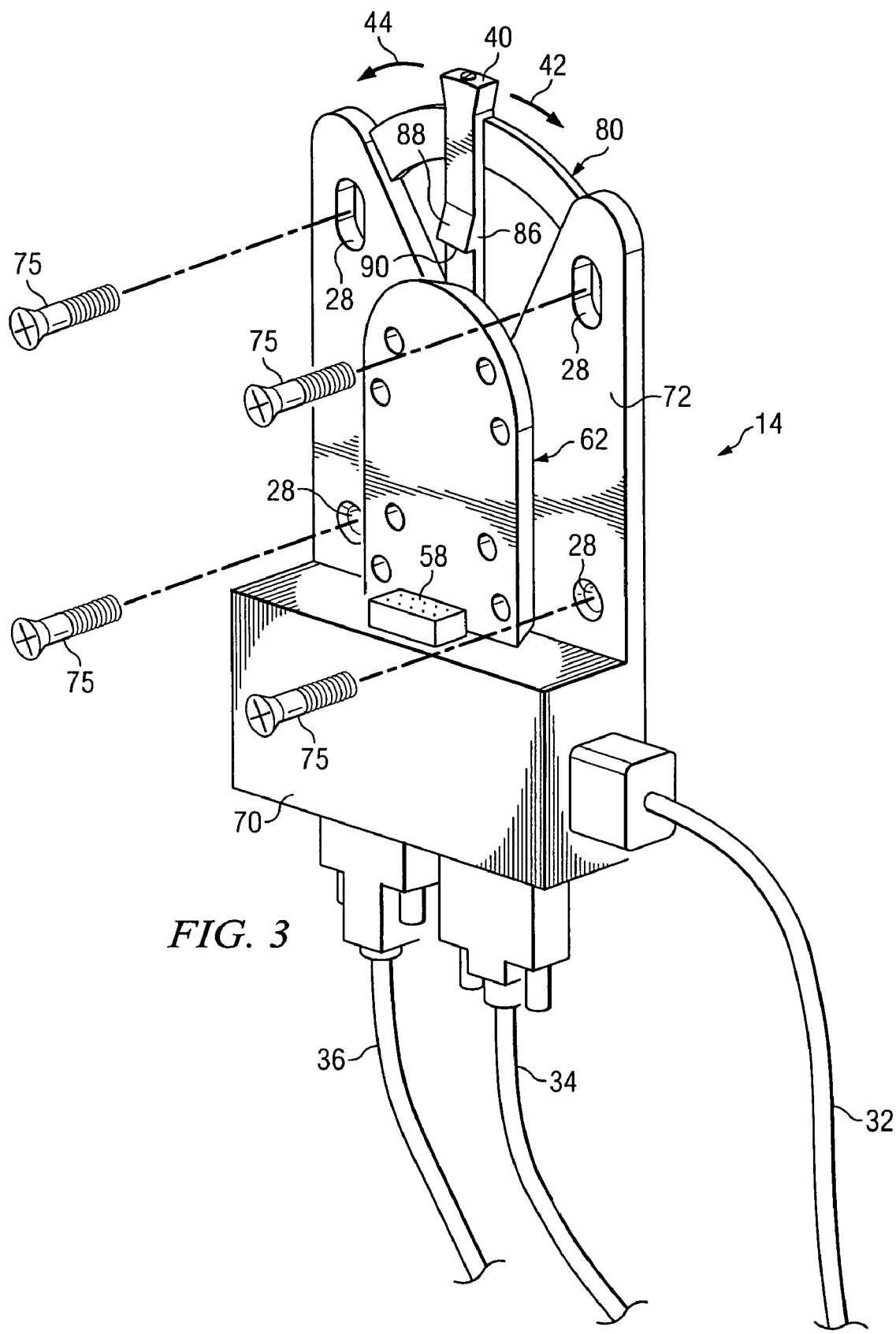
FIG. 3 is a diagram illustrating another portion of the quick connect system of FIG. 1.

FIGS. 1-3 are diagrams illustrating an embodiment of a quick connect system 12 for an electronic device 8 in accordance with the present invention. In the embodiment illustrated in FIGS. 1-3 electronic device 8 comprises a display device 10; however, it should be understood that electronic device 8 can comprise other devices, such as, but not limited to, thin client computing devices, ceiling projectors, table projectors, plasma and liquid crystal display televisions, printers, and/or any other electronic devices. In the embodiment illustrated in FIGS. 1-3, quick connect system 12 comprises a docking station 14 configured to cooperate with an adapter 16 coupled to display device 10. In some embodiments of the present invention, adapter 16 is used to convert a standard display device, such as, but not limited to, a flat panel liquid crystal display ("LCD") 18, to a readily dockable display device 10. Docking station 14 is preferably configured to be attached to a support structure 20 such as, for example, a multi-display support structure 22. However, it should be understood that support structure 20 may comprise any other type of structure for supporting display device 10, such as, but not limited to, a display arm, a desktop flat panel display stand, a wall and/or a table.

In the embodiment illustrated in FIGS. 1-3, multi-display support structure 22 comprises a mounting plate 24 disposed on a support member 26. Docking station 14 comprises a plurality of openings 28 (FIG. 3) adapted to align with corresponding openings 30 located on mounting plate 24 to enable attachment of mounting plate 24 to docking station 14 (e.g., using screws or other attachment devices). In some embodiments of the present invention, openings 28 and 30 are configured in accordance with spacing guidelines implemented by the Video Electronics Standards Association ("VESA"). It should be further understood that docking station 14 may be configured to be directly couplable to and/or integral with multi-display support structure 22 (e.g., formed as a single integral structure by welding, bonding, etc.).

Referring to FIG. 2, adapter 16 comprises a plurality of mounting openings 46 located to correspond with threaded openings on a rear surface 10r of display device 10 to couple adapter 16 to display device 10 (e.g., by screws 48). Thus, embodiments of the present invention effectively convert display device 10 to a dockable display device 10 for engagement with docking station 14 (FIG. 1) by use of adapter 16. A power cable 50 and data input/output 52 and 54 communicatively couple adapter 16 to display device 10. It should be understood that other types of connections and/or communications may be provided between adapter 16 and display device 10. In the embodiment illustrated in FIG. 2, adapter 16 comprises at least one connector 56 configured to communicatively engage a corresponding connector 58 located on docking station 14 (FIG. 3). Referring to FIG. 3, power is supplied to docking station 14 through cable 32 from a remote power source, and data input/output signals (e.g., analog and/or digital video and/or non-video communications) are transmitted through cables 34 and 36 between docking station 14 and another computer device or other data content source.

Thus, in the embodiment illustrated in FIGS. 1-3, docking station 14 is configured to be communicatively couplable to adapter 16, and adapter 16 is configured to be communicatively couplable to display device 10. Accordingly, power, data input/output signals and other types of communications are provided to display device 10 via docking station 14 and adapter 16. Embodiments of the present invention enable such communications between docking station 14 and display device 10 in response to docking of display device 10 (with adapter 16) to docking station 14 (e.g., engagement of connectors 56 and 58 in response to docking of computer device 10/adapter 16 to docking station 14).

Referring to FIG. 2, adapter 16 comprises a guide element 60 configured to cooperate with and/or otherwise engage a corresponding guide element 62 disposed on docking station 14 (FIG. 3). In the embodiment illustrated in FIG. 2, guide element 60 comprises a dovetail guide element 60 configured to engage and/or otherwise cooperate with a corresponding dovetail guide element 62 on docking station 14 (FIG. 3). However, it should be understood that guide elements 60 and 62 may be otherwise configured (e.g., having other complementary shapes and/or cooperating elements). The dovetail configuration of guide elements 60 and 62 substantially prevents disengagement of adapter 16 and docking station 16 in the directions indicated generally by arrows 68a, 68b, 68c and 68d in FIG. 2. However, it should be understood that guide elements 60 and 62 may be otherwise cooperatively configured. In the embodiment illustrated in FIG. 2, guide element 60 is integral formed on adapter 16 (i.e., formed as a single, unitary structure). However, it should be understood that guide element 60 may be configured to be a separate component attachable to adapter 16.

In the embodiment illustrated in FIGS. 1-3, system 12 comprises a locking mechanism 38 to releasably secure adapter 16 (with display device 10) to docking station 14. In the embodiment illustrated in FIGS. 1-3, locking mechanism 38 comprises a locking arm 40 that is preferably biased in a generally upright position when in a locked condition. Thus, in operation, locking arm 40 is movable in the directions indicated by arrows 42 or 44 (FIG. 3) to unlock locking mechanism 38, thereby enabling adapter 16/display device 10 to be lifted and/or moved upwardly relative to docking station 14 to disengage adapter 16/display device 10 from docking station 14.

Referring to FIG. 3, docking station 14 comprises a base member 70 and a mounting wall 72 extending upwardly from base member 70. Mounting wall 72 is used to couple docking station 14 to multi-display support structure 22 (FIG. 1) or another structure. For example, openings 28 on mounting wall 72 are preferably configured to align with openings 30 on mounting plate 24 (FIG. 1) to enable a plurality of bolts 75 to secure docking station 14 to multi-display support structure 22. In the embodiment illustrated in FIG. 3, guide element 62 is disposed adjacent mounting wall 64 to correspondingly engage guide element 60 on adapter 16 (FIG. 2).

Referring to FIG. 3, locking arm 40 of docking station 14 is movable along a track 80 of docking station 14 in the directions indicated by 42 and 44. In the embodiment illustrated in FIG. 3, locking arm 40 comprises an extension 86 having a sloped top surface 88 and is flexible to enable slideable engagement with recessed areas 94, 104a and 104b of guide element 60 of adapter 16 (FIG. 2). Locking arm 40 further comprises a bottom surface 90 adapted to engage a bottom wall 92 of recessed area 94 of adapter 16 (FIG. 2) when extension 86 is disposed within recessed area 94. Recessed areas 104a and 104b of guide element 60 comprise open bottom portions 106a or 106b, respectively, to enable disengagement of extension 86 of locking arm 40 therefrom in response to disengagement of adapter 16 from docking station 14 (described further below).

Figure 4:
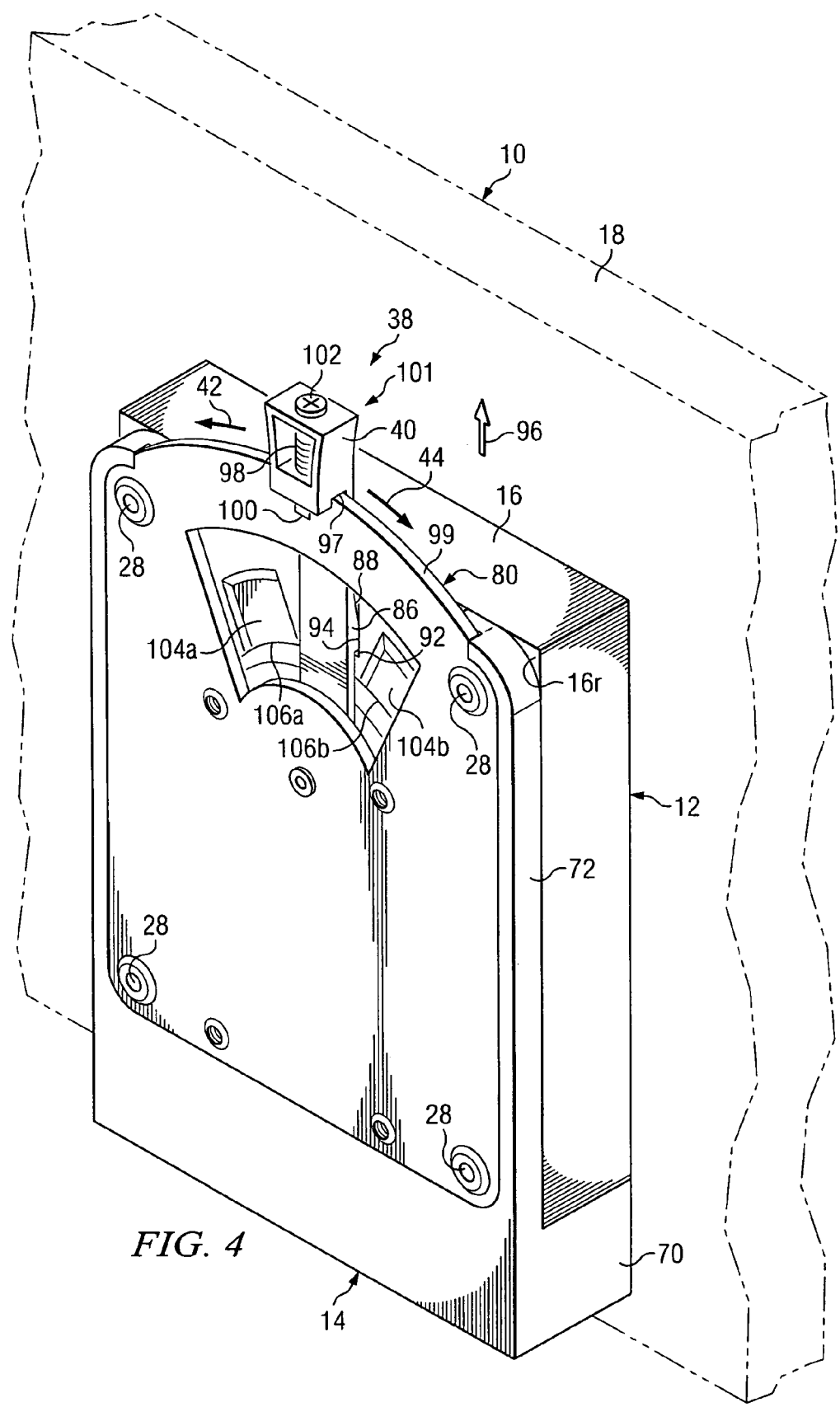
FIG. 4 is a diagram illustrating an enlarged view of the quick connect system of FIG. 1 in a locked position.
Figure 5:
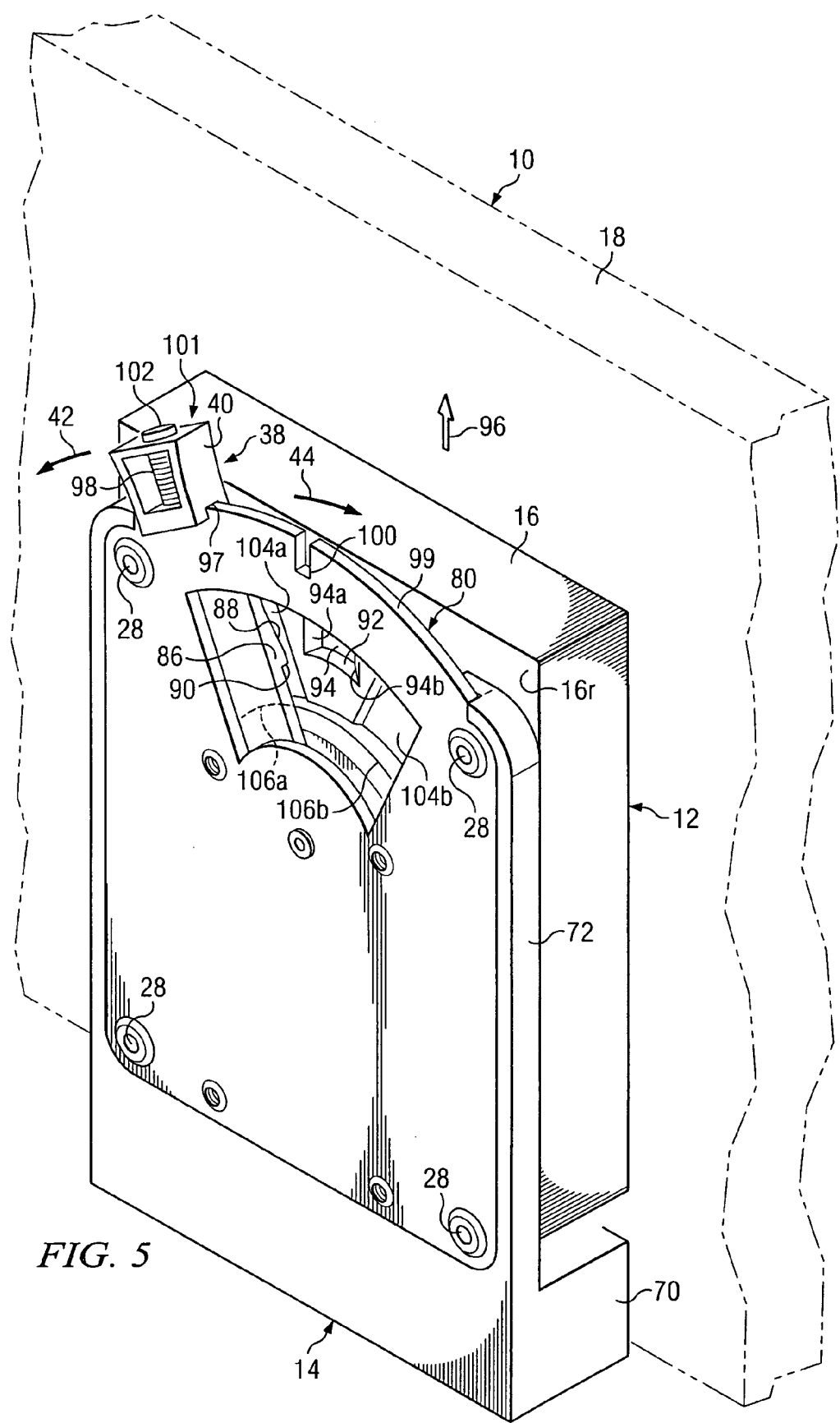
FIG. 5 is a diagram illustrating an enlarged view of the quick connect system of FIG. 1 in an unlocked position.

FIGS. 4 and 5 are diagrams illustrating an embodiment of locking mechanism 38 of the quick connect system 12 of FIGS. 1-3 in the locked and unlocked positions, respectively. Referring to FIG. 4, locking arm 40 is disposed in the locked position to securely fasten adapter 16 to docking station 14. In the locked position, locking arm 40 is positioned in a generally upright position such that extension 86 of locking arm 40 is disposed within recessed area 94 of adapter 16, and bottom surface 90 of extension 86 contacts and/or otherwise engages bottom wall 92 of recessed area 94, thereby preventing separation of adapter 16 from docking station 14 (e.g., preventing movement of adapter 16 in the direction indicated by generally by arrow 96 relative to docking station 14).

In the embodiment illustrated in FIGS. 4 and 5, locking mechanism 38 comprises a locking assembly 98 disposed on locking arm 40 to securely fasten locking arm 40 in a fixed position relative to adapter 16, thereby preventing movement of locking arm 40 along track 80 and preventing inadvertent disengagement of docking station 14 and adapter 16. In the embodiment illustrated in FIGS. 4 and 5, locking arm 40 comprises a notch 97 for receiving an upper surface 99 of track 80 therein to facilitate slideable engagement of locking arm 40 with track 80. In the embodiment illustrated in FIGS. 4 and 5, locking assembly 98 comprises a recess 100 formed at a medial location on upper surface 99 of track 80 for cooperating with a fastener 102 insertable through an upper portion 101 of locking arm 40. In operation, fastener 102 is insertable through upper portion 101 of locking arm 40 and into recess 100, thereby securing locking arm 40 in a fixed position relative to track 80. In some embodiments of the present invention, fastener 102 comprises a security screw requiring a special key/tool to lock or unlock. However, it should be understood that other methods and/or devices may be used to secure locking arm 40 in a fixed or locked position, and it should be understood that other locations of track 80 (e.g., other than a medial location) may be used for securing locking arm 40 in a fixed position.

In operation, fastener 102 is loosened and/or removed, thereby enabling slideable movement of locking arm 40 relative to track 80 in the directions indicated by arrows 42 and 44. Referring to FIGS. 4 and 5, in response to movement of locking arm 40 in the direction indicated by arrow 42, extension 86 travels along a ramp 94a to flex locking arm 40 in order to disengage recessed area 94 and engage adjacently positioned channel 104a, thereby positioning locking arm 40 in an unlocked position. In response to upward movement of adapter 16/display device 10 in the direction indicated by 96 relative to docking station 14, extension 86 exits chamber 104a through open bottom portion 106a, thereby facilitating disengagement of adapter 16/display device 10 from docking station 14. In response to movement of extension 86 through open bottom portion 106a and out of channel 104a, locking arm 40 is biased, and thereby automatically returns, to a generally upright or locking position to facilitate re-engagement of docking station with adapter 16/display device 10. It should be understood that the above-described cooperation of locking arm 40 and channel 104a also applies to channel 104b in response to movement of locking arm 40 in the direction indicated by arrow 44. Correspondingly, to engage adapter 16/display deice 10 to docking station 14, guide element 60 of adapter 16 (FIG. 2) is slid downwardly in a direction opposite that indicated by 96 (FIGS. 4 and 5) into engagement with guide element 62 of docking station 14 (FIG. 3) to a position where extension 86 engages recessed area 94 and bottom surface 90 of extension 86 engages bottom wall 92 of recessed area 94, thereby securing adapter 16/display device 10 to docking station 14.

Figure 6A:
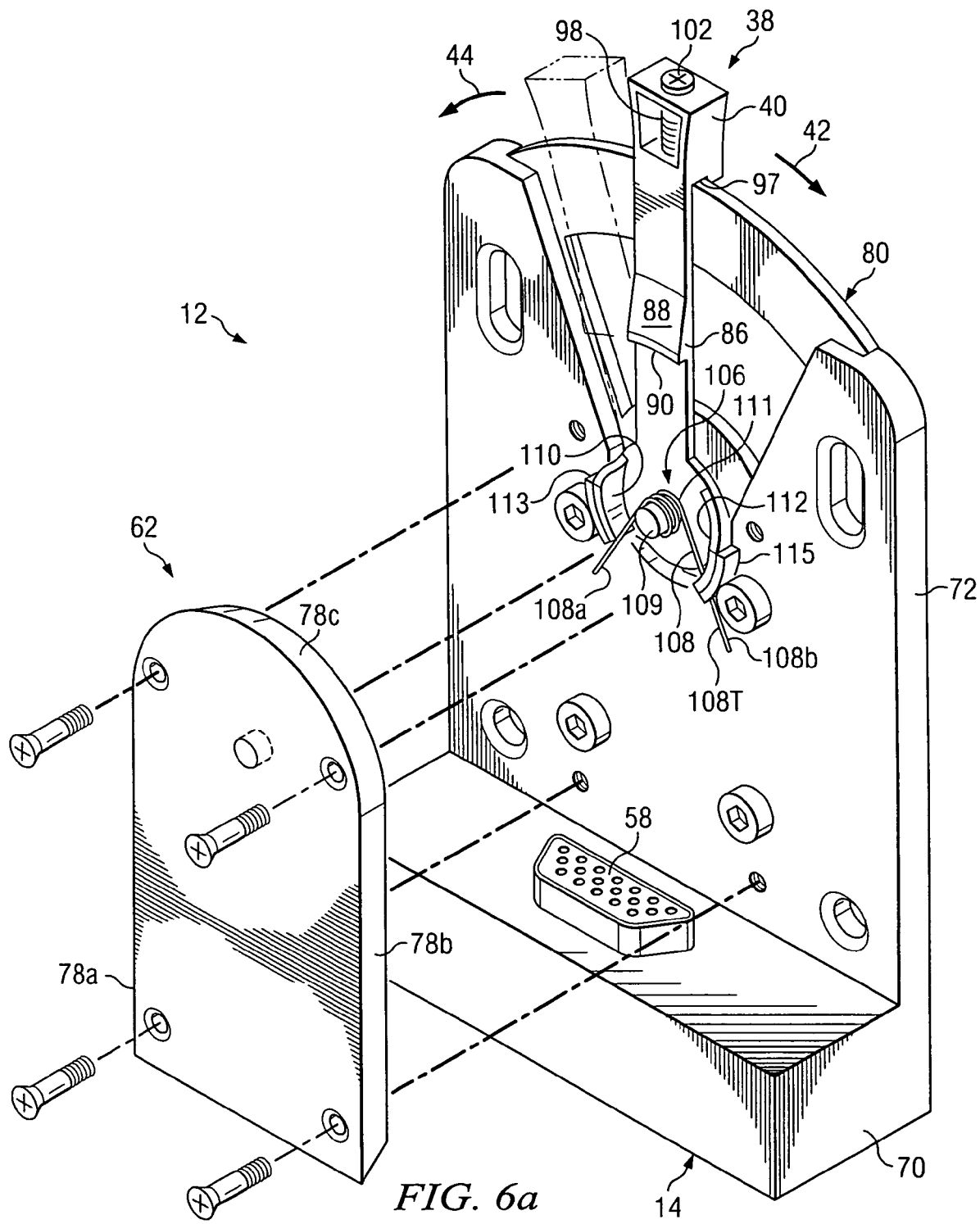
FIG. 6a is a diagram illustrating an exploded view of an embodiment of a docking station of the quick connect system of FIG. 1.

FIG. 6a is a diagram illustrating an exploded view of an embodiment of docking station 14 in accordance with the present invention. In the illustrated embodiment, locking arm 40 is biased in a generally upright position with respect to docking station 14 by a biasing mechanism 106. In the embodiment illustrated in FIG. 6a, biasing mechanism 106 comprises a spring 108, such as, but not limited to, a torsion spring 108T having first and second end portions 108a and 108b to engage a pair of shoulders 110 and 112 on locking arm 40 and shoulders 113 and 115 on mounting wall 72. Locking arm 40 is pivotally coupled to base member 70 about a pin 109, and a center portion 111 of spring 108 is disposed over pin 109. In operation, first and second end portions 108a and 108b exert a force on shoulders 110, 112, 113 and 115, to bias locking arm 40 in a generally upright position so that extension 86 aligns with and is otherwise readily insertable within recessed area 94 of adapter 16 (FIG. 2) during installation of adapter 16/display device 10 with docking station 14. In response to movement of locking arm 40 in the directions indicated by either arrows 42 or 44, shoulders 110 and 115 (if locking arm 40 is moved in the direction of arrow 42) or shoulders 112 and 113 (if locking arm 40 is moved in the direction of arrow 44) compress spring 108, thereby causing a corresponding force to be applied to shoulder 110 or 112 to bias locking arm 40 in a generally upright position.

Figure 6B:
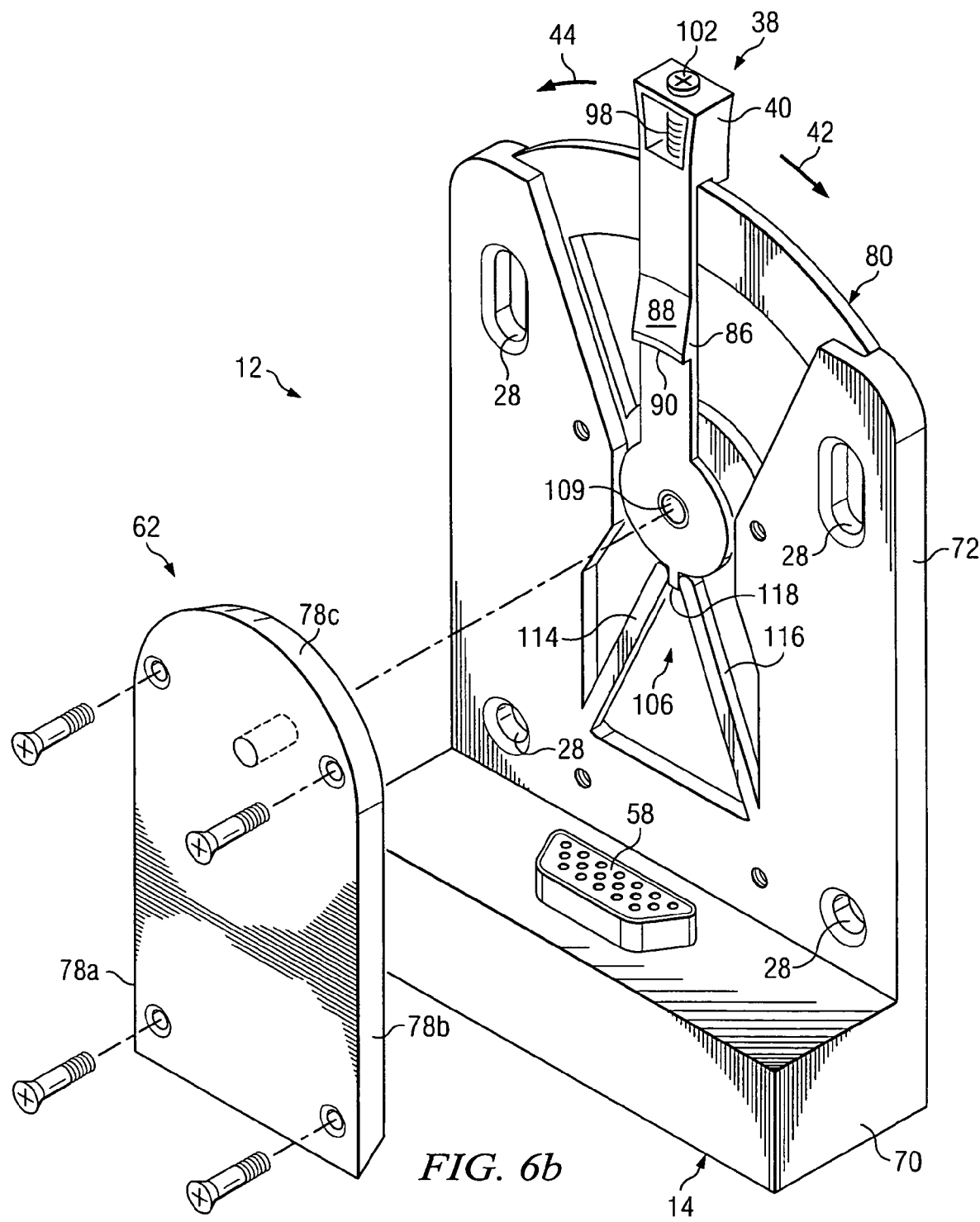
FIG. 6b is a diagram illustrating an exploded view of another embodiment of a docking station of the device quick connect system of FIG. 1 in accordance with the present invention.

FIG. 6b is a diagram illustrating an exploded view of another embodiment of docking station 14 in accordance with the present invention. In the embodiment illustrated in FIG. 6b, biasing mechanism 106 comprises a pair flexible arms 114 and 116 configured to engage a tab 118 on locking arm 40 to maintain locking arm 40 generally upright with respect to docking station 16. In response to movement of locking arm 40 in either of the directions indicated by 42 and 44, flexible arms 114 or 116 deflect and cause a corresponding force to be applied to tab 118 to bias locking arm 40 toward an upright position.

Figure 7:
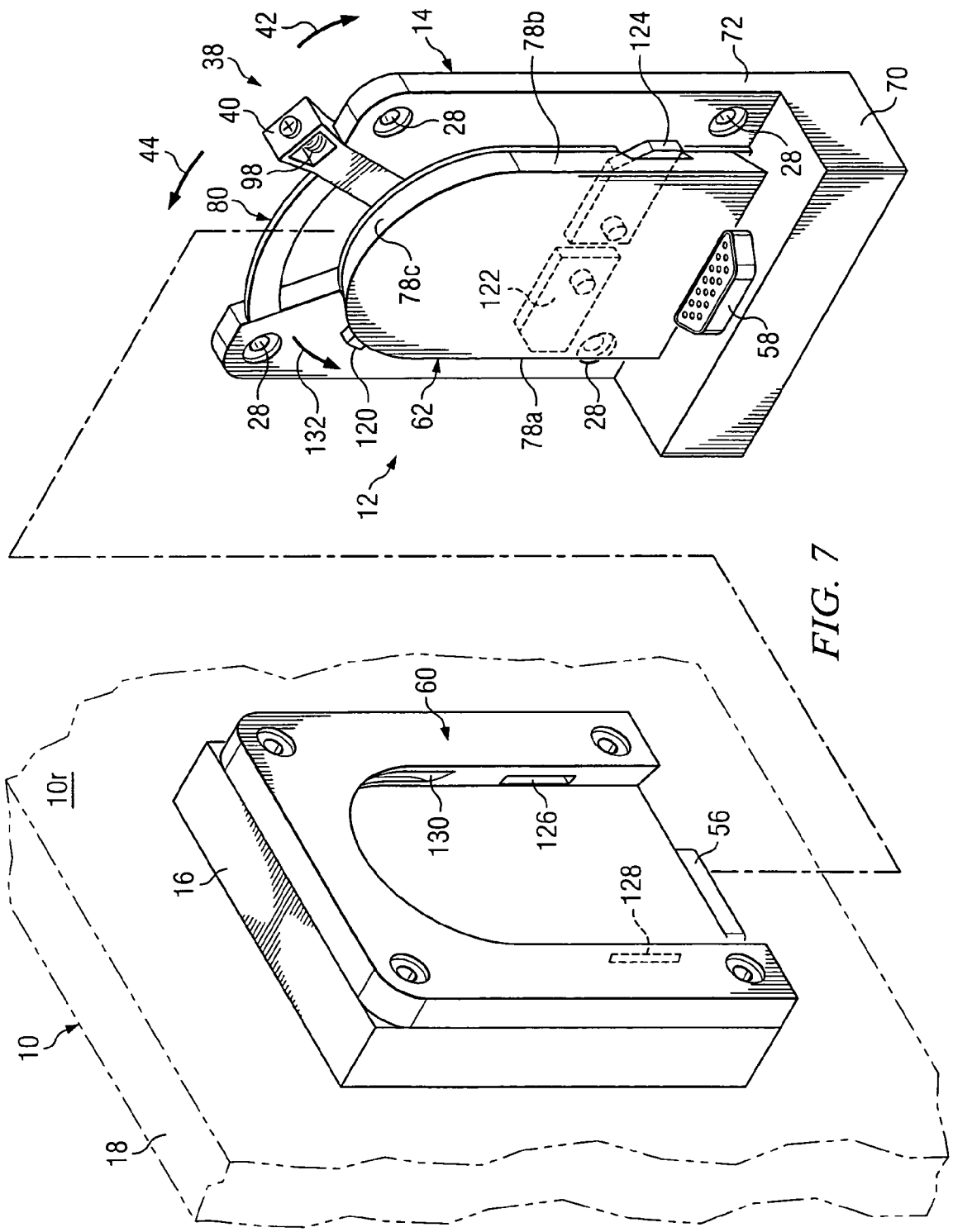
FIG. 7 is a diagram illustrating another embodiment of a quick connect system in accordance with the present invention.
Figure 8:
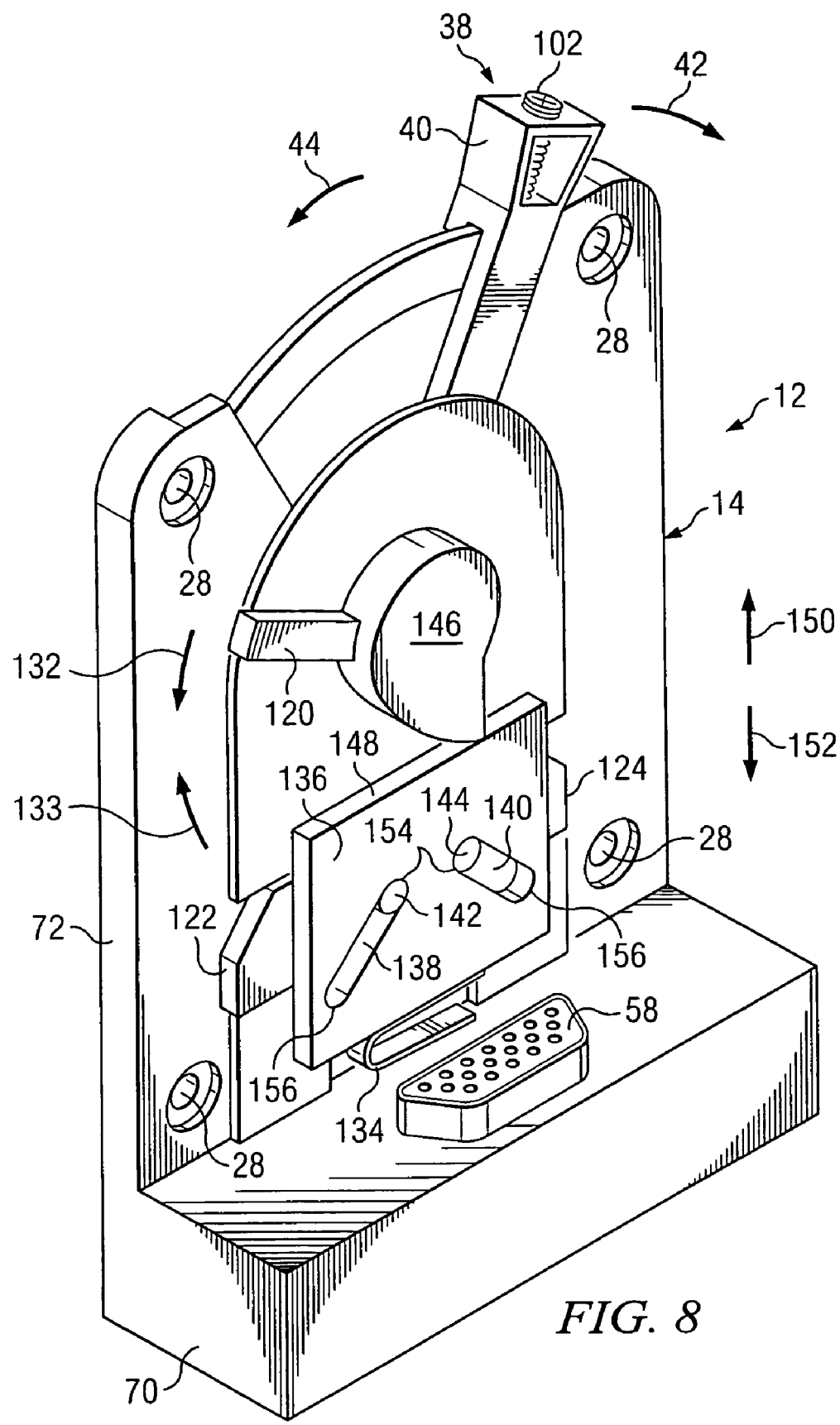
FIG. 8 is a diagram illustrating an enlarged view of the quick connect system of FIG. 7 in an unlocked position.
Figure 9:
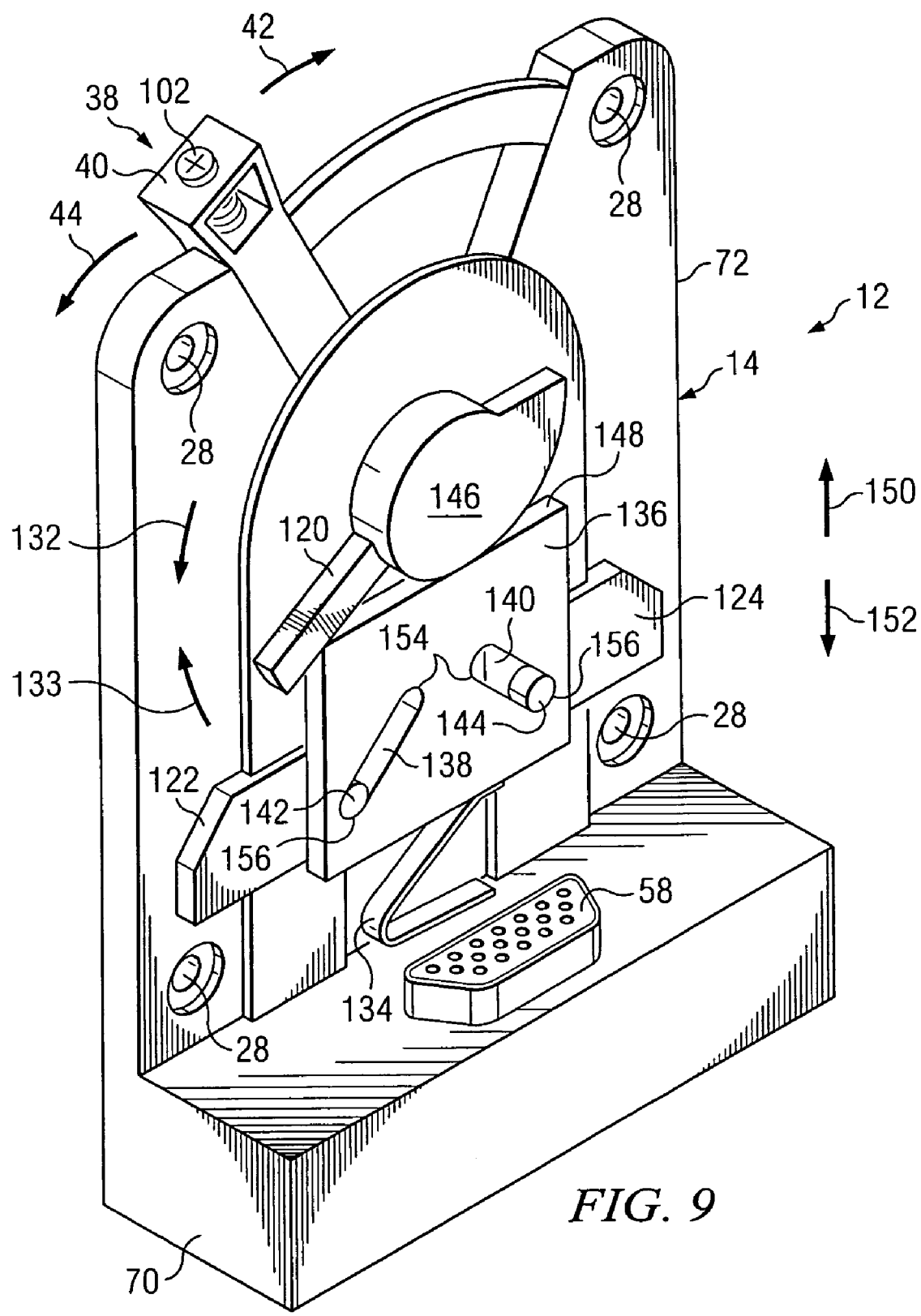
FIG. 9 is a diagram illustrating an enlarged view of the quick connect system of FIG. 7 in a locked position.

FIGS. 7-9 are diagrams illustrating another embodiment of quick connect system 12 in accordance with the present invention. In the embodiment illustrated in FIGS. 7-9, locking mechanism 38 comprises a cam arm 120 coupled to locking arm 40 by a cam 146, and a pair of extension members 122 and 124 configured to cooperate with and/or otherwise be insertable into respective recessed areas 126 and 128 formed on guide element 60 of adapter 16. It should be understood that locking mechanism 38 and adapter 16 may be configured having a greater or fewer quantity of extension members and respective recessed areas. In the embodiment illustrated in FIGS. 7-9, locking mechanism 38 also comprises a slider 136 biased upwardly in the direction indicated by arrow 150 towards cam 146 by a biasing mechanism 134 (e.g., a spring clip). In the embodiment illustrated in FIGS. 7-9, slider 136 comprises a pair of slots 138 and 140 configured to cooperate with and/or otherwise receive pins 142 and 144 extending from respective extension members 122 and 124. Cam 146 is configured to engage a top surface 148 of slider 136 to move slider 136 in the directions indicated by arrows 150 and 152. For example, in the embodiment illustrated in FIGS. 7-9, rotation of cam 146 in the direction of arrow 132 causes movement of slider 136 in the direction indicated by arrow 150 caused by biasing element 134 and a reduction in a profile of cam 146. Correspondingly, rotation of cam 146 in a direction opposite that indicated by arrow 132 causes movement of slider 136 in the direction indicated by arrow 152. Further, the cooperation of pins 142 and 144 with slots 138 and 140, respectively, causes extension and retraction of extension members 122 and 124. For example, referring to FIGS. 8 and 9, in response to movement of slider 136 in direction indicated by arrow 150, slots 138 and 140 are correspondingly moved in the direction indicated by arrow 150, thereby causing 142 and 144 to be forced outwardly in the directions indicated by arrows 158 and 159 and causing extension of extension members 122 and 124.

Thus, in response to slideable engagement of guide element 60 with guide element 62, an interior portion of a recess 130 formed on guide element 62 engages cam arm 120, thereby causing cam arm 120 to move in the direction indicated generally by arrow 132. In response to movement of cam arm 120 in the direction indicated by arrow 132, locking arm 40 moves in the direction of arrow 44 and extension arms 122 and 124 automatically extend from a retracted position (FIG. 8) to an extended position (FIG. 9) into recessed areas 126 and 128 of guide element 60 (FIG. 7). In some embodiments of the present invention, a set screw 102 is used on locking arm 40 to lock and/or otherwise prevent movement of locking arm 40 (and cam arm 120), thereby maintaining locking mechanism 38 in the locked position to prevent inadvertent retraction of extension members 122 and 124. In the embodiment illustrated in FIG. 7, guide element 60 comprises a separate element attachable to adapter 16. However, it should be understood that guide element 62 illustrated in FIG. 7 may be formed integrally with adapter 16 and/or display device 10 (i.e., formed as an integral, unitary structure).

It should be understood that disengagement of adapter 16/display device 10 from docking station 14 in the embodiment illustrated in FIGS. 7-9 is obtained by a reverse operation of the above description. For example, after loosening and/or removal of set screw 102, and in response to movement of adapter 16/display device 10 in the direction indicated by arrow 150 relative to docking station 14, an interior portion of recess 130 of guide element 60 (FIG. 7) engages cam arm 120, thereby causing movement of cam arm 120 in the direction indicated by arrow 133. In response to movement of cam arm 130 in the direction indicated by arrow 133, cam 146 engages surface 148 of slider and moves slider 136 in the direction of arrow 152, thereby causing retraction of extension members 122 and 124 (FIGS. 8 and 9). Further, it should also be understood that guide element 60, recessed areas 126 and 128, and recess 130 may be formed integrally with rear surface 10r (FIGS. 2 and 7) of display device 10 (i.e., formed as a single, unitary structure).

Figure 10:
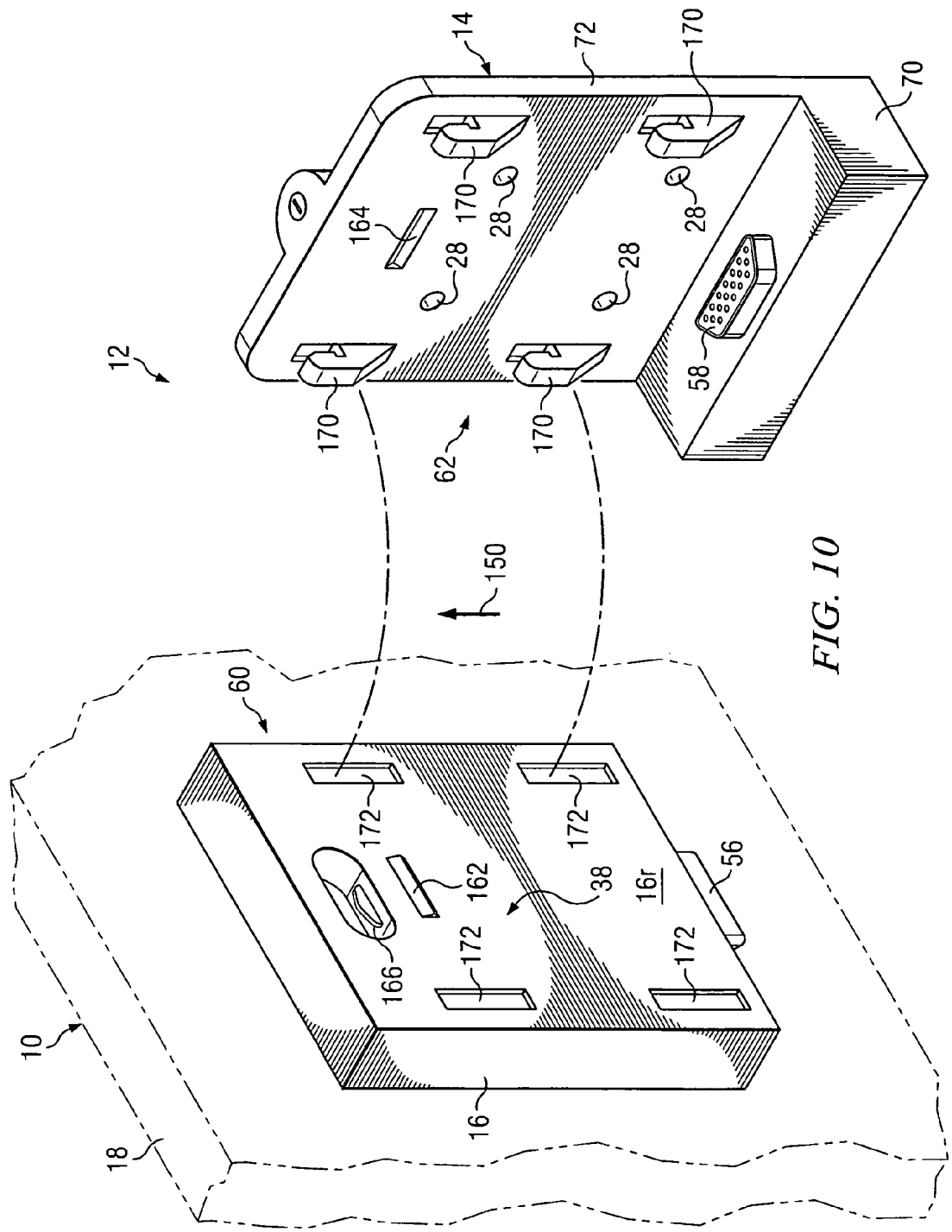
FIG. 10 is a diagram illustrating another embodiment of a quick connect system in accordance with the present invention.

FIG. 10 is a diagram illustrating another embodiment of quick connect system 12 in accordance with the present invention. In the embodiment illustrated in FIG. 10, guide element 62 of docking station 14 comprises hooks 170 configured to engage corresponding recesses 172 of guide element 60 formed on rear surface 16r of adapter 16. In FIG. 10, four hooks 170 are illustrated. However, it should be understood that a greater or fewer quantity of hooks 170 and corresponding recesses 172 may be used. In the embodiment illustrated in FIG. 10, locking mechanism 38 comprises a retractable extension 162 configured to cooperate with and/or otherwise be insertable into an opening 164 formed on docking station 14. A lever 166 is coupled to extension 162 to cause extension/retraction of extension 162. In operation, after engagement of adapter 16/display device 10 with docking station 14 (e.g., in response to hooks 170 being inserted into corresponding recesses 172, lever 166 is actuated to cause extension of extension 162 into opening 164 to lock or secure adapter 16/display device 10 to docking station. Reverse actuation of lever 166 causes retraction of extension member 162 from opening 164, thereby facilitating disengagement of adapter 16/display device 10 from docking station 14.

Figure 11A:
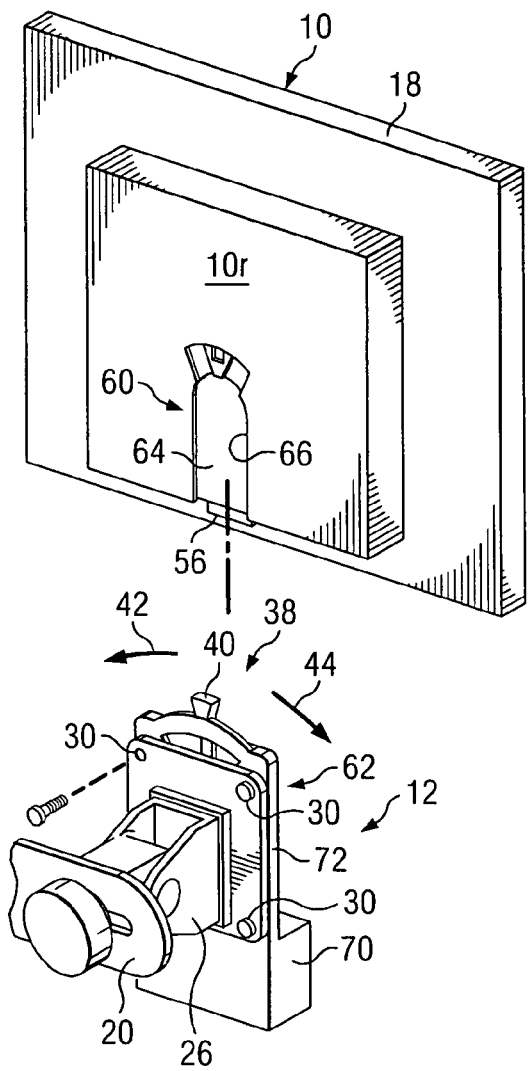
FIG. 11a is a diagram illustrating an embodiment of an integrally formed guide element disposed on an electronic device in accordance with the present invention.
Figure 11B:
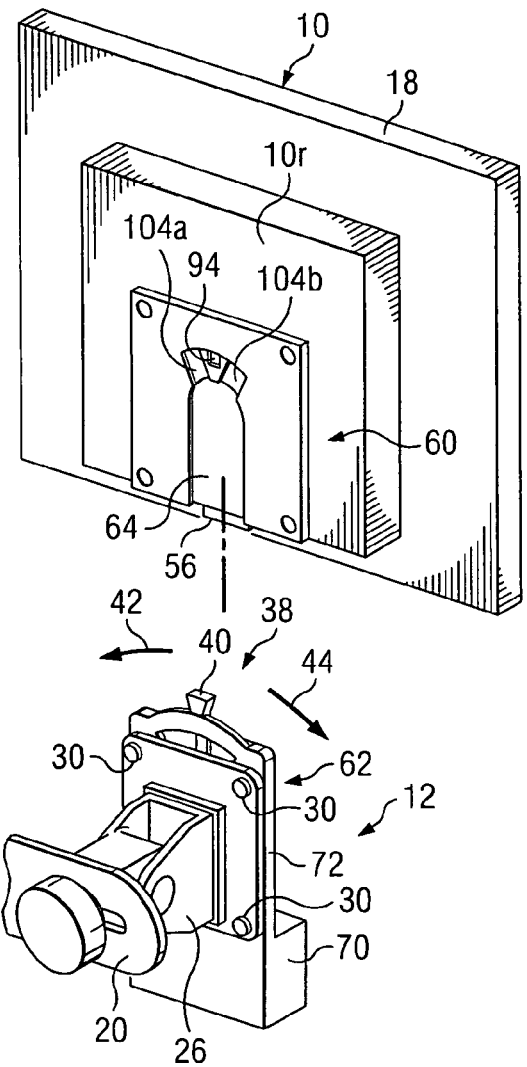
FIG. 11b is a diagram illustrating an embodiment of an attachable electronic device guide element in accordance with the present invention.

FIGS. 11a and 11b are diagrams illustrating another embodiment of quick connect system 12 in accordance with the present invention. In the embodiment illustrated in FIG. 11a, display device 10 is configured to be directly coupled to docking station 14 (i.e., without adapter 16). Display device 10 comprises guide element 60 formed integrally (i.e., as a single, unitary structure) with rear surface 10r of display device 10 to engage corresponding guide element 62 on docking station 14. In operation, guide element 60 is aligned with and inserted onto corresponding guide element 62 of docking station 14 as described above. It should be understood that in some embodiments of the present invention, docking station 14 is configured with connector 58 (e.g., FIG. 3) and display device 10 is configured having connector 56 to facilitate communicative coupling of display device 10 to docking station 14. In the embodiment illustrated in FIG. 11b, guide element 60 is configured as a separate element attachable to rear surface 1 Or of display device 10 to enable display device 10 to be coupled with docking station 14.

Figure 12:
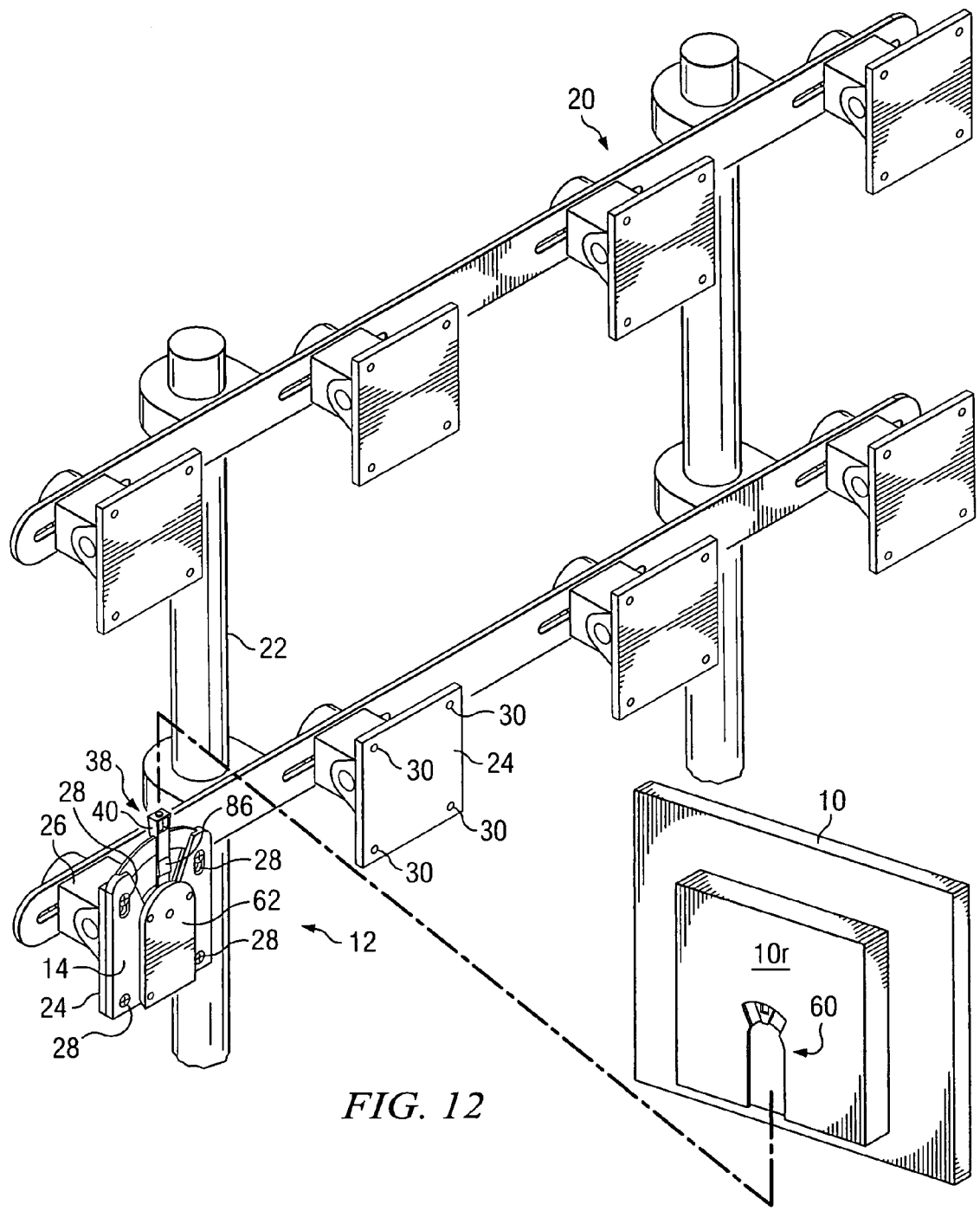
FIG. 12 is a diagram illustrating another embodiment of a quick connect system in accordance with the present invention.

FIG. 12 is a diagram illustrating another embodiment of quick connect system 12 in accordance with the present invention. In the embodiment illustrated in FIG. 12, docking station 14 is illustrated without base member 70 and corresponding connector 58, thereby accommodating wireless electronic device 8 applications and/or connecting of electronic devices 8 to other computer systems or data content sources using other methods. In the embodiment illustrated in FIG. 12, docking station 14 comprises locking mechanism 38, as discussed above, to releasably secure display device 10 to support structure 20. In the embodiment illustrated in FIG. 12.

Figure 13:
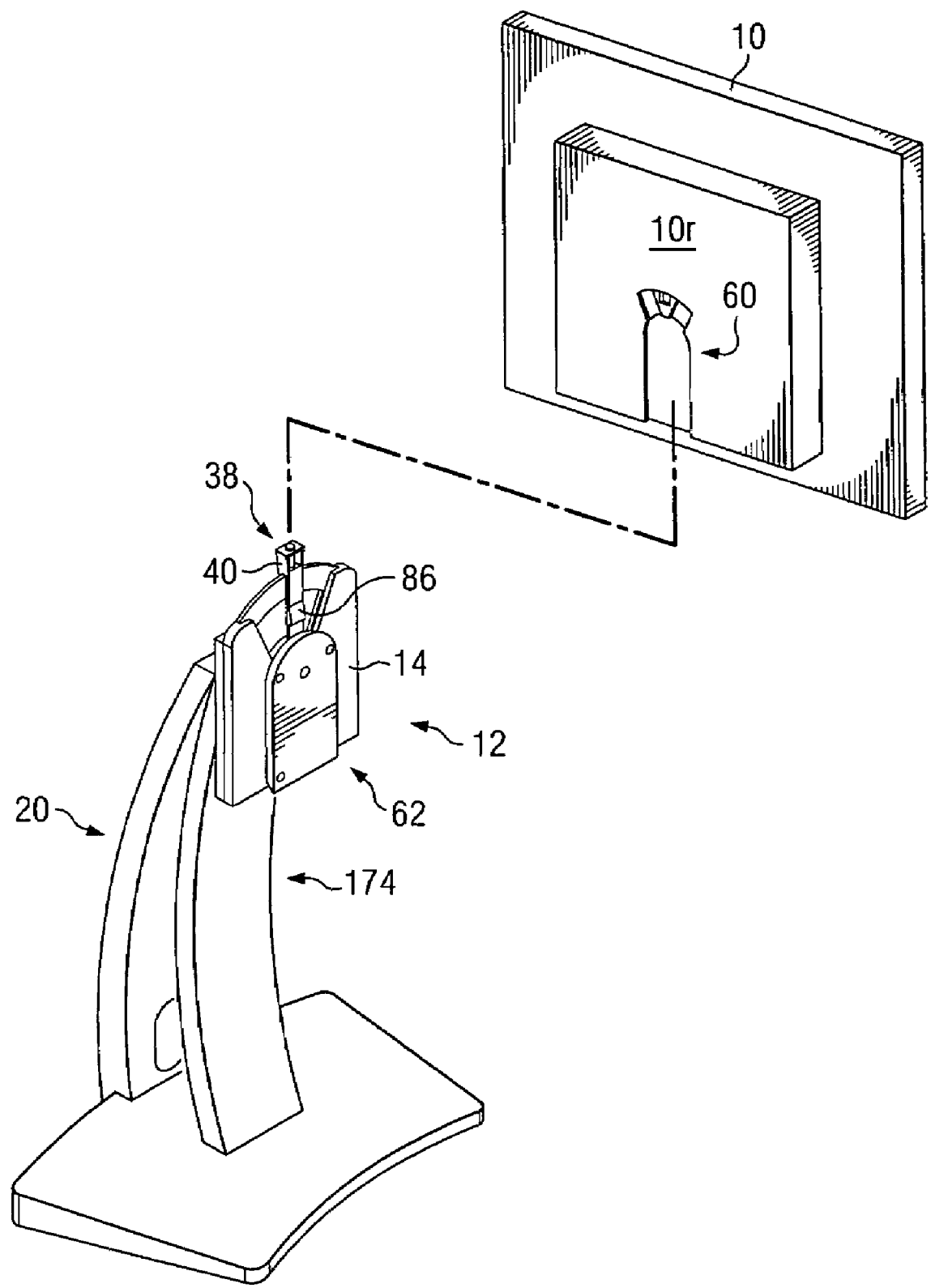
FIG. 13 is a diagram illustrating another embodiment of a quick connect system in accordance with the present invention.

FIG. 13 is a diagram illustrating another embodiment of quick connect system 12 in accordance with the present invention. In the embodiment illustrated in FIG. 13, docking station 14 is illustrated without base member 70 and corresponding connector 58, thereby accommodating wireless electronic device 8 applications and/or connecting of electronic devices 8 to other computer systems or data content sources using other methods. In the embodiment illustrated in FIG. 13, docking station 14 is disposed on a flat panel display stand 174. It should be understood that quick connect system 12 may be otherwise disposed, including, but not limited to, on a display arm, a wall and/or a table.

Thus, embodiments of the present invention provide a quick connect system 12 that is configurable to readily transform a non-dockable electronic device 8 to a dockable electronic device 8. In addition, embodiments of the present invention enable display device 10 having a guide element 60 configured to cooperatively engage a complementary guide element 62 of quick connect system 12 to releasably couple display device 10 to docking quick connect system 12. Further, embodiments of the present invention provide a quick connect system 12 having a locking mechanism 38 actuatable from a locked position to an unlocked position such that locking mechanism 38 is configured to independently remain in the unlocked position and automatically return to a locking position in response to disengagement of the electronic device 8 from docking station 14, thereby enabling easier docking and undocking of the display device 10.

What is claimed is:

1. A quick connect system for an electronic device, comprising:
a docking station configured to engage the electronic device, the docking station having a locking mechanism comprising a pivotable locking arm actuatable to an unlocked position, the locking mechanism configured to independently remain in the unlocked position and automatically return to a locking position in response to disengagement of the electronic device from the docking station.

2. The quick connect system of claim 1, wherein the docking station comprises a guide element configured to engage a corresponding guide element disposed on the electronic device.

3. The quick connect system of claim 1, wherein the docking station comprises a dovetail guide element configured to engage a corresponding dovetail guide element disposed on the electronic device.

4. The quick connect system of claim 1, wherein the locking arm is biased upright relative to the electronic device in the locking position.

5. The quick connect system of claim 1, wherein the locking mechanism comprises at least one extension member configured to cooperatively engage a corresponding recess disposed on the electronic device.

6. The quick connect system of claim 1, wherein the locking mechanism comprises at least one retractable extension member to secure the electronic device to the docking station.

7. The quick connect system of claim 1, wherein the locking arm is movable along a track between a locked position and an unlocked position.

8. The quick connect system of claim 1, wherein the locking arm comprises an extension for engaging a recessed area disposed on the electronic device.

9. The quick connect system of claim 1, wherein the locking mechanism comprises a locking assembly for securing a locking arm of the locking mechanism in a fixed position relative to the docking station.

10. The quick connect system of claim 1, wherein the locking arm is biased to a locked position relative to the docking station.

11. The quick connect system of claim 1, wherein the locking mechanism comprises a cam movable to cause engagement of an extension member of the docking station with the electronic device.

12. The quick connect system of claim 1, wherein the locking arm is biased in a locked position when the electronic device is removed from the docking station.

13. A quick connect system for an electronic device, comprising:
a docking means configured to engage the electronic device, the docking means having a locking means comprising a pivotable arm means actuatable to an unlocked position, the locking means configured to independently remain in the unlocked position and automatically return to a locking position in response to disengagement of the electronic device from the docking means.

14. The quick connect system of claim 13, wherein the arm means is biased to a locked position relative to the docking means.

15. The quick connect system of claim 13, wherein the locking means comprises at least one extendable means configured to engage the electronic device.

16. The quick connect system of claim 13, wherein the pivotable arm means is movable along a track means to configure the locking means between a locked position and an unlocked position.

17. The quick connect system of claim 13, wherein the locking means comprises means for preventing actuation of the locking means.

18. A method of manufacturing a quick connect system for an electronic device, comprising:
providing a docking station configured to engage the electronic device, the docking station having a locking mechanism comprising a pivotable locking arm actuatable to an unlocked position, the locking mechanism configured to independently remain in the unlocked position and automatically return to a locking position in response to disengagement of the electronic device from the docking station.

19. The method of claim 18, further comprising biasing the locking arm to a locked position relative to the docking station.

20. The method of claim 18, further comprising configuring the locking mechanism having at least one extension member for engaging the electronic device.

21. The method of claim 18, further comprising configuring the locking mechanism having a locking arm movable along a track between a locked position and an unlocked position.

22. The method of claim 18, further comprising configuring the locking mechanism having a retractable extension member for engaging the electronic device.

23. The method of claim 18, further comprising providing a locking assembly for preventing actuation of the locking mechanism.

24. The method of claim 18, further comprising configuring the locking mechanism having a cam for causing extension of at least one member of the locking mechanism into engagement with the electronic device.

25. The method of claim 18, further comprising biasing the locking arm in a locked position when the electronic device is removed from the docking station.

26. A quick connect system for an electronic device, comprising:
a docking station configured to engage the electronic device, the docking station having a locking mechanism actuatable to an unlocked position, the locking mechanism configured to independently remain in the unlocked position and automatically return to a locking position in response to disengagement of the electronic device from the docking station, wherein the docking station comprises a dovetail guide element configured to engage a corresponding dovetail guide element disposed on the electronic device.

27. A quick connect system for an electronic device, comprising:
a docking station configured to engage the electronic device, the docking station having a locking mechanism actuatable to an unlocked position, the locking mechanism configured to independently remain in the unlocked position and automatically return to a locking position in response to disengagement of the electronic device from the docking station, wherein the locking mechanism comprises at least one retractable extension member to secure the electronic device to the docking station.

28. A quick connect system for an electronic device, comprising:
a docking station configured to engage the electronic device, the docking station having a locking mechanism actuatable to an unlocked position, the locking mechanism configured to independently remain in the unlocked position and automatically return to a locking position in response to disengagement of the electronic device from the docking station, wherein the locking mechanism comprises a cam movable to cause engagement of an extension member of the docking station with the electronic device.

* * * * *

UNITED STATES PATENT AND TRADEMARK OFFICE
CERTIFICATE OF CORRECTION

| | |
|---|---|
| PATENT NO. | : 7,317,613 B2 |
| APPLICATION NO. | : 11/263483 |
| DATED | : January 8, 2008 |
| INVENTOR(S) | : David Quijano et al. |

It is certified that error appears in the above-identified patent and that said Letters Patent is hereby corrected as shown below:

In column 6, line 38, delete "1Or" and insert -- 10r --, therefor.

In column 7, line 13, delete "1 Or" and insert -- 10r --, therefor.

Signed and Sealed this

Twenty-seventh Day of May, 2008

JON W. DUDAS
*Director of the United States Patent and Trademark Office*